(12) United States Patent
Tsirkin

(10) Patent No.: US 12,535,873 B2
(45) Date of Patent: Jan. 27, 2026

(54) OPTIMIZED POWER MANAGEMENT FOR COMPUTER SYSTEMS

(71) Applicant: RED HAT, INC., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 40 days.

(21) Appl. No.: 18/344,102

(22) Filed: Jun. 29, 2023

(65) Prior Publication Data

US 2025/0004535 A1    Jan. 2, 2025

(51) Int. Cl.
*G06F 1/329*  (2019.01)
*G06F 9/50*  (2006.01)

(52) U.S. Cl.
CPC ............ *G06F 1/329* (2013.01); *G06F 9/5094* (2013.01)

(58) Field of Classification Search
CPC ................................. G06F 1/329; G06F 9/5094
USPC ......................................................... 713/323
See application file for complete search history.

(56) References Cited

U.S. PATENT DOCUMENTS

| | | | | |
|---|---|---|---|---|
| 5,617,572 A * | 4/1997 | Pearce | ..................... | G06F 1/325 713/323 |
| 6,064,659 A * | 5/2000 | Rohani | ............... | H04W 52/283 370/318 |
| 6,289,399 B1 * | 9/2001 | Furuichi | ............... | G06F 1/3287 710/16 |
| 6,498,460 B1 * | 12/2002 | Atkinson | .............. | G06F 1/3203 320/135 |
| 7,581,125 B2 * | 8/2009 | Ranganathan | ........ | G06F 1/3296 713/340 |
| 8,738,093 B1 * | 5/2014 | Gopalakrishnan | ... | H04B 1/3838 455/100 |
| 8,935,011 B2 * | 1/2015 | Tischer | ..................... | H02J 7/00 700/297 |
| 2002/0083403 A1 * | 6/2002 | Murayama | ............ | G06F 30/367 716/112 |
| 2003/0149904 A1 * | 8/2003 | Kim | ...................... | G06F 1/3287 713/330 |
| 2004/0163001 A1 * | 8/2004 | Bodas | ..................... | G06F 1/305 713/300 |
| 2005/0078405 A1 * | 4/2005 | Baek | ................... | G11B 5/59611 |
| 2006/0179333 A1 * | 8/2006 | Brittain | ............... | G11C 11/4096 713/320 |
| 2006/0282685 A1 * | 12/2006 | Bahali | .................. | G06F 1/3203 713/300 |

(Continued)

FOREIGN PATENT DOCUMENTS

CN  112231077 A  1/2021
KR  20170094899 A  8/2017

*Primary Examiner* — Paul R. Myers
(74) *Attorney, Agent, or Firm* — Dority & Manning, P.A.

(57) ABSTRACT

A method includes: associating, by a processing device, a process running on a computing system with a first power usage control group of a plurality of power usage control groups, wherein each power usage control group is associated with a respective power usage quota to be shared by a plurality of processes associated with the power usage control group; determining an amount of available power supply in the computing system; and throttling, for each process of a first plurality of processes associated with the first power usage control group, a corresponding power consumption based on a first power usage quota associated with the first power usage control group.

19 Claims, 6 Drawing Sheets

(56) References Cited

U.S. PATENT DOCUMENTS

| | | | |
|---|---|---|---|
| 2006/0282689 A1* | 12/2006 | Tipley | G06F 9/4893 713/300 |
| 2007/0049133 A1* | 3/2007 | Conroy | G06F 1/30 439/894 |
| 2008/0052545 A1* | 2/2008 | Finkelstein | G06F 1/3228 713/300 |
| 2009/0193276 A1* | 7/2009 | Shetty | H02J 1/14 713/340 |
| 2010/0070977 A1* | 3/2010 | Fortsch | G06F 9/4881 718/103 |
| 2010/0332871 A1* | 12/2010 | Allalouf | G06F 9/5027 713/320 |
| 2011/0162647 A1* | 7/2011 | Huby | A61M 16/16 128/203.14 |
| 2012/0159209 A1* | 6/2012 | Stemen | G06F 9/4893 713/320 |
| 2012/0185706 A1* | 7/2012 | Sistla | G06F 1/3206 713/300 |
| 2013/0042118 A1* | 2/2013 | Robben | G06F 1/329 713/300 |
| 2016/0113002 A1* | 4/2016 | Frank | H04W 72/51 370/329 |
| 2016/0209063 A1* | 7/2016 | Fang | F24F 11/30 |
| 2016/0252945 A1* | 9/2016 | Ou | G06F 1/329 713/320 |
| 2016/0323191 A1 | 11/2016 | Aoki | |
| 2019/0041971 A1* | 2/2019 | Ananthakrishnan | G06F 9/30101 |
| 2020/0341533 A1* | 10/2020 | Ho | G06F 1/3296 |
| 2021/0191751 A1 | 6/2021 | Park et al. | |
| 2022/0113882 A1* | 4/2022 | Shin | G06F 3/0625 |
| 2022/0149625 A1* | 5/2022 | Thyagaturu | H02J 3/008 |
| 2022/0229483 A1* | 7/2022 | Shabbir | G06F 11/3037 |
| 2022/0369089 A1* | 11/2022 | Venkatram | H04W 72/1263 |
| 2023/0205301 A1* | 6/2023 | Duenas | G06F 1/3234 713/300 |
| 2023/0246978 A1* | 8/2023 | Kadu | H04L 47/20 370/229 |

\* cited by examiner

OPTIMIZED POWER MANAGEMENT FOR COMPUTER SYSTEMS

TECHNICAL FIELD

The implementations of the disclosure generally relate to computer systems and, more specifically, to optimized power management for computer systems.

BACKGROUND

Power management relates to the ability to control the power consumed by computer systems, such as turning off power on electrical components of the computer systems or switching the computer systems to work in in a low-power state.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
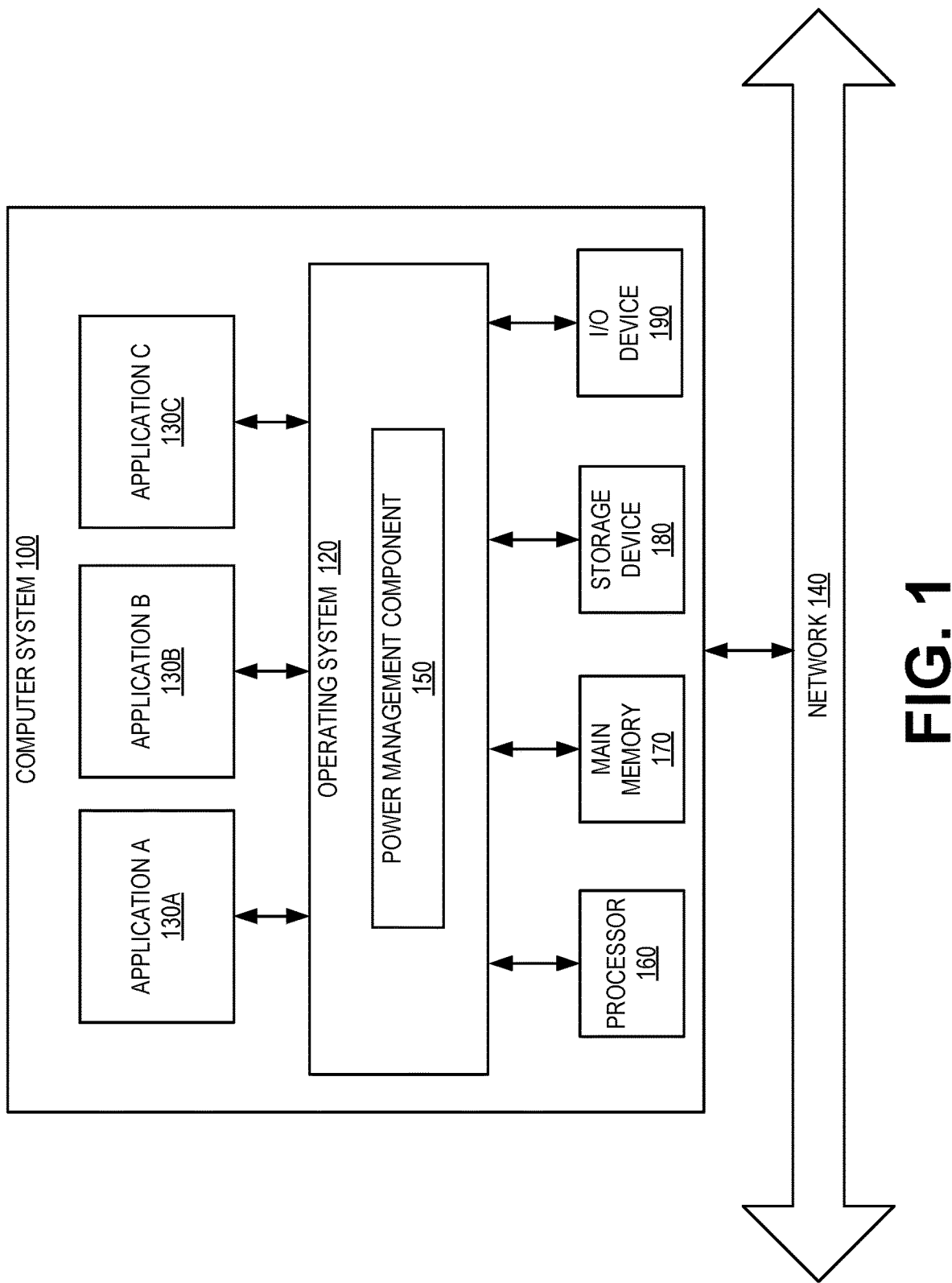
FIG. 1 is an example computer system architecture, in accordance with an embodiment of the present disclosure.

Described herein are methods and systems for implementing optimized power management for computer systems. Power management for a computer system may involve monitoring status of hardware components of a computer system and configuring the hardware components accordingly (e.g., by putting unused components to sleep). For example, a computer system may place a central processing unit (CPU) of the computer system in a processor idle state to save power (e.g., a C-state defined in the Advanced Configuration and Power Interface (ACPI) specification). Although some technology, such as energy aware scheduling (EAS), gives the computer system the ability to predict the impact of its decisions on the power consumed by CPUs, the balance between the performance of the computer system and the power consumption of the computer system is still in demand. Furthermore, the computer system, especially the battery powered system such as mobile devices, lacks capability of using decisions made by a user of the computer system to manage power consumed by different tasks of the computer system.

Aspects of the present disclosure address the above and other deficiencies by providing optimized power management for a computer system utilizing resource allocation. Specifically, a power management component can create a group—a collection of processes—having a power usage criterion defined. The group may include one or more processes (e.g., applications, tasks, threads, etc.). The power usage criterion for a group of processes refers to a criterion for power usage by each process, and, for example, may be in a form of quota of the total power supply. In one implementation, processes in the group can have a shared quota of the total power supply for the group. As such, the processes can be arranged within different groups, where each group has a different quota for optimized power management purpose. The power management component can store a definition of the created group in a configuration file.

A power management component can monitor the status of available power supply (e.g., supplied by one or more batteries in the computer system) and calculate a power usage allowance for the group based on the status of available power supply and the power usage criterion. The power usage allowance refers to a maximum amount of power that can be consumed by the group within a time period. For example, the power management component can calculate the power usage allowance by multiplying the amount of the available power supply by the power usage quota. The power management component can calculate the power usage allowance periodically at a predefined frequency, or upon detecting a power event (e.g., an event for consumption of power exceeding a threshold value, or upon receiving a user request).

The power management component can enable one or more resource controllers to control the power consumed by the resources (e.g., processor, memory, storage, I/O access, interface) associated with the process(es) of the group according to the power usage allowance. In some implementations, the power management component can allocate the resources, such as by using the resources controllers to set CPU time, control the access to memory, limit the network bandwidth, etc., such that the power consumed by the resources does not exceed the power usage allowance. The purpose of the throttling power consumption is to enforce the quota such that the quota will not be exceeded. In some implementations, the power management component can monitor, such as by taking a static snapshot or recording dynamic running of the resource data, the power consumed by the process(es) of the group and detect that the power consumed by the process(es) of the group reaches the power usage allowance. Responsive to detecting that the power consumed by the process(es) of the group reaches the power usage allowance, the power management component can adjust the parameter(s) of the resources (or reallocate the resources) through the resource controllers such that the power consumed by the resources does not exceed the power usage allowance (i.e., throttling the power consumption). To adjust the parameter(s) of the resources, the resource controllers can perform at least one of: setting limits on input/output access to and from I/O devices; setting limits on memory use by processes in the group; using the CPU scheduler to provide processes access to the CPU; assigning/reassigning individual CPUs (on a multicore system) and memory nodes to processes in the group; allowing or denying access to devices (e.g., memory or storage devices, processing devices, I/O devices) for processes in the group; suspending or resuming processes in the group; etc. Examples of these resource controllers include various drivers associated with the resources.

In some implementations, the power management component may detect that the power usage allowance is below a predetermined threshold value (e.g., the power usage allowance is too low to run a specific process). The power management component may take some preliminary mitigation measure for power usage, such as reducing the priority of a process that consumes a high amount of power, pausing a process that has a low priority; reducing the frequency for scheduling a process that has low priority, etc. The power management component can notify a user of the detection and provide recommendations for actions, such as terminating the process, running the process as before (e.g., ignoring the detection), overriding the power usage allowance (e.g., turning off the detection), etc.

The systems and methods described herein include technology that enhances power management for a computer system. In particular, aspects of the present disclosure provide technology that enhances the performance of power management and power usage efficiency in a computer system. The technology also enables a user to control power usage for certain processes.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 140. The computer system 100 may be a server, a mainframe, a workstation, a personal computer (PC), a mobile phone, a palm-sized computing device, etc. The network 140 may be a private network (e.g., a local area network (LAN), a wide area network (WAN), intranet, etc.) or a public network (e.g., the Internet).

The computer system 100 may include processer (e.g., central processing unit (CPU)) 160, main memory 170, storage device 180, and an Input/Output (I/O) device 190. The processor 160 may be a single core processor, which may be capable of executing one instruction at a time (e.g., single pipeline of instructions), or a multi-core processor, which may simultaneously execute multiple instructions. The main memory 170 may include volatile memory devices (e.g., random access memory (RAM)), non-volatile memory devices (e.g., flash memory), and/or other types of memory devices that servers as a primary memory. The storage device 180 may include a magnetic hard disk, a Universal Serial Bus (USB) solid state drive, a Redundant Array of Independent Disks (RAID) system, a network attached storage (NAS) array, that serves as a secondary memory, interconnected as shown. The I/O device 190 may include a keyboard, a computer mouse, a monitor, a printer, and devices for communication between computers, such as modems and network cards. It should be noted that although, for simplicity, a single processor, a single memory, a single storage device, and a single I/O device are depicted in FIG. 1, in some other embodiments computer system 100 may comprise a plurality of processors, a plurality of memory, a plurality of storage devices, and a plurality of I/O devices.

The computer system 100 runs an operating system (OS) 120, which may comprise software, hardware, or both, that manages the hardware resources of the computer system and that provides functions such as inter-process communication, scheduling, virtual memory management, and so forth. In some implementations, the operating system 120 also comprises a hypervisor, which provides a virtual operating platform for virtual machines (VMs) and that manages its execution. It should be noted that in some other examples, hypervisor may be external to the operating system 120. VM may be a software implementation of a machine that executes programs as though it were an actual physical machine.

The operating system (OS) 120 runs a set of applications 130A-130C. The applications 130A-130C may include tasks, processes, threads, etc. Each application 130A-130C may use one or more of the devices, including processer 160, main memory 170, storage device 180, and I/O device 190, to perform processes. The computer system 100 may include a power management component 150 that can perform power management for applications 130A-103C and/or any other suitable component of computer system 100. In some embodiments, the power management component 150 is implemented as a hardware, a firmware, or a combination thereof. In some embodiments, the power management component 150 is part of the computer system 100, an application, or another operating system. In other embodiments, processor 160 includes at least a portion of power management component 150 and is configured to perform the functionality described herein.

In some implementations, the power management component 150 may allocate resources to applications 130A-103C. In some implementations, the power management component 150 includes a kernel feature called control groups (e.g., cgroups). The kernel feature allows the computer system to allocate resources—such as CPU time, system memory, network bandwidth, or combinations of these resources—among user-defined groups of processes running on the computer system 100.

Specifically, the power management component 150 may set a power usage criterion (e.g., a quota) and configure, by writing values in a configuration file, a group of processes such that each process within the group is bound by the power usage criterion. For example, the power management component 150 may configure a first group of processes including application 130A, a second group of processes including application 130B, and a third group of processes including application 130C. The power management component 150 may set the first group of processes that are bound by power usage being no more than X quota of the available power of the computer system, set the second group of processes that are bound by power usage being no more than Y quota of the available power of the computer system, and set the third group of processes that are bound by power usage being no more than Z quota of the available power of the computer system.

Although for simplifying the description with respect to FIG. 1, each group is illustrated as including only one application (i.e., first group includes application A, second group includes application B, third group includes application C), each group can include more applications, and aspects of the present disclosure applied to one application of the group is applicable to all applications within the group together as a unit. That is, for example, application A can be considered as application A1, application A2, . . . , application AN, and the applications A1-N are treated as a unit that is same as application A with respect to the aspects of the present disclosure.

In some implementations, the groups can be arranged hierarchically in a structure tree. For example, the first group may include internally created processes (e.g., based on a configuration file), the second group may include externally created processes (e.g., user sessions, containers, virtual machines), and the first group are placed in a higher hierarchical rank than the second group in the structure tree in the computer system 100. For example, when the second group is placed as a child of the first group in the structure tree, the second group may inherit limits from the first group, in addition to its own limits of the second group, according to the aspects of the present disclosure. For example, a corresponding power consumption for the second group is throttled to not exceed the throttled corresponding power consumption for the first group.

In some implementations, the power management component 150 provides a user interface that allows a user to give instructions for configuring a group of processes and the power usage criterion. For example, the power management component 150 may receive requests (e.g., from VM, etc.) to place an application in a particular group of processes and may fulfill such requests.

In some implementations, the power management component 150 determines a metrics of an application, create a group of processes according to the metrics or places the application in a group of processes according to the metrics, and uses a preset power criterion for the group. For example, the power management component 150 may determine the metrics as a category of an application, e.g., an education application, an entertainment application, a navigation application, etc., or a sub-category of an application, e.g., a gaming application, a streaming application, a social media application, etc. As another example, the power management component 150 may determine the metrics as a using frequency of an application, e.g., an hourly-used application, a daily-used application, a weekly-used application. As yet another example, the power management component 150 may determine the metrics as a using duration of an application, e.g., a minute-duration application, an hour-duration application, etc. As yet another example, the power management component 150 may determine the metrics as a priority associated with an application, e.g., a tier-1-priority application, a tier-2-priority application, etc. The tiers of the priority can be determined according to a user instruction or a preset default rank. In some implementations, the groups of processes can be configured at boot time and reestablished during the operation of the computer system.

The groups of processes provided by the power management component 150 can then be used by the operating system 120 to constrain the power usage of resources (e.g., processor, memory, storage, and I/O access) of each of the processes according to the configuration of the particular group. Specifically, the power management component 150 can monitor the groups that have been configured, and deny or limit one or more processes in one or more groups the access to certain resources. By using groups, the system administrators can gain fine-grained control over allocating, prioritizing, denying, managing, and monitoring system resources. Power resources can be appropriately divided up among tasks and users, increasing overall efficiency of power usage.

In some implementations, the power management component 150 can determine the available power supply of the computer system 100, and calculate the proportional power usage allowance for applications in the groups. For example, the available power supply of the computer system 100 can be represented by a remaining battery percentage, and the power management component 150 can determine the available power supply of the computer system 100 to be A % remaining battery of the computer system, and calculate the power usage allowance for application 130A to be A % remaining battery multiplying X quota, the power usage allowance for application 130B to be A % remaining battery multiplying Y quota, and the power usage allowance for application 130C to be A % remaining battery multiplying Z quota.

The power management component 150 can allocate the resources (e.g., processor 160, main memory 170, storage device 180, and I/O device 190) to the processes in the groups according to the respective power usage allowance. The power management component 150 can adjust parameter(s) of the resource(s) according to the respective power usage allowance. The parameters of the resources may include a parameter for input/output access by the first process, a parameter for memory access by the first process, a power state of a central processing unit (CPU) used by the first process, a number of the resource allocated to the first process, or a size of the resource allocated to the first process. In some implementations, a predefined table may provide a power usage allowance with the corresponding allocation parameters. For example, a first allocation parameter may indicate the maximum number of CPUs allocated for the corresponding power usage allowance, a second allocation parameter may indicate the maximum number of memory (and/or storage) devices allocated for the corresponding power usage allowance, and a third allocation parameter may indicate the maximum number of I/O devices allocated for the corresponding power usage allowance. Other parameters are also applicable, which may include a parameter indicating a specific type of CPUs, memory (and/or storage) devices, or I/O devices allocated for the corresponding power usage allowance, etc. In some implementations, the power management component 150 can further determine the number of the processes running in the system and allocate the resources by taking into consideration of power usage of all running processes, for example, by proportioning the resources according to the proportions of the power usage allowance for each process over the total power usage allowances of the running processes.

The power management component 150 can monitor, such as by taking a static snapshot or recording dynamic running of the resource data, the power consumption of the processes in the groups according to the respective power usage allowance. In some implementations, the power consumption of the process is monitored by using the total power consumed by the process, which may include the power used by the processor 160, main memory 170, storage device 180, and I/O device 190.

The power management component 150 can determine whether the power consumption of a process exceeds a respective power usage allowance. Responsive to determining that a power consumption of a process exceeds a respective power usage allowance, the power management component 150 can limit the power consumption of a process by limiting power consumed by at least one resource used by the process. The resources may include one or more processors 160, one or more main memory 170, one or more storage devices 180, and one or more I/O devices 190.

To limit the power consumed by processor 160, the power management component 150 can switch a processor power state where processor 160 dispatches and executes instructions to a power saving state (e.g., lower-power idle states) where no instructions are executed and power consumption is reduced to a desired level. For example, a given processor power states may be associated with an entry method that may be performed to place processor 160 in the processor power state (e.g., entering the processor power state). The entry method may include execution of one or more instructions for processor 160, such as an instruction that halts processor 160 (e.g., places processor 160 in a HALT state) until an interruption is sent to processor 160, an instruction that may halt processor 160 until data has been written a memory address within a designated range, etc. In some embodiments, the processor power states may include one or more processor idle states, such as one or more C-states in accordance with the Advanced Configuration and Power Interface (ACPI) standard. The power management component 150 can use a scheduler to control the access to processors by a process. The power management component 150 can also control the number of processors assigned to perform a process.

To limit the power consumed by memory 170 and storage device 180, the power management component 150 can set limits on parameters (e.g., page size) for memory/storage use. The power management component 150 can control the number of memory/storage assigned to perform a process. The power management component 150 can divide memory/storage into partitions and control the memory/storage power usage by assigning different partitions and different number of the partitions. To limit the power consumed by I/O device 190, the power management component 150 can set limits on parameters (e.g., bandwidth) for input/output access to and from I/O devices. The power management component 150 can limit the communication traffic through I/O devices. The power management component 150 can control the number of I/O devices assigned to perform a process.

The power management component 150 may generate one or more data structures including information of processes (e.g., applications) regarding the power consumption. For example, the data structure may be a table including multiple records. Each record may include, for example, an identifier of an application, a metric of an application, a power usage criterion associated with an application, a power usage allowance during a time period associated with the application, etc.

In some implantations, the power management component 150 can detect that power usage of a resource allocated to the process or the power usage allowance is below a threshold value, and the power management component 150 can take some mitigation measure with respect to the power usage, notify a user of the detection and provide recommendations for actions, such as terminating the process, running the process as before (e.g., ignoring the detection), overriding the power usage allowance (e.g., turning off the detection), etc. For example, when detecting that the power usage allowance is below a threshold value (e.g., too low) to run a resource (e.g., a monitor) or entire resources (e.g., a CPU and a monitor) allocated to the process, the power management component 150 can take some preliminary mitigation measure for power usage, such as reducing the priority of a process that consumes a high amount of power, pausing a process that has a low priority; reducing the frequency for scheduling a process that has low priority, etc. The power management component 150 can notify a user and provide recommendations, through a user interface, e.g., turning off the monitor but keeping running the process, terminating the process, etc. The recommendations can be predefined and provided as a list for a user, through a user interface, to choose.

Figure 2:
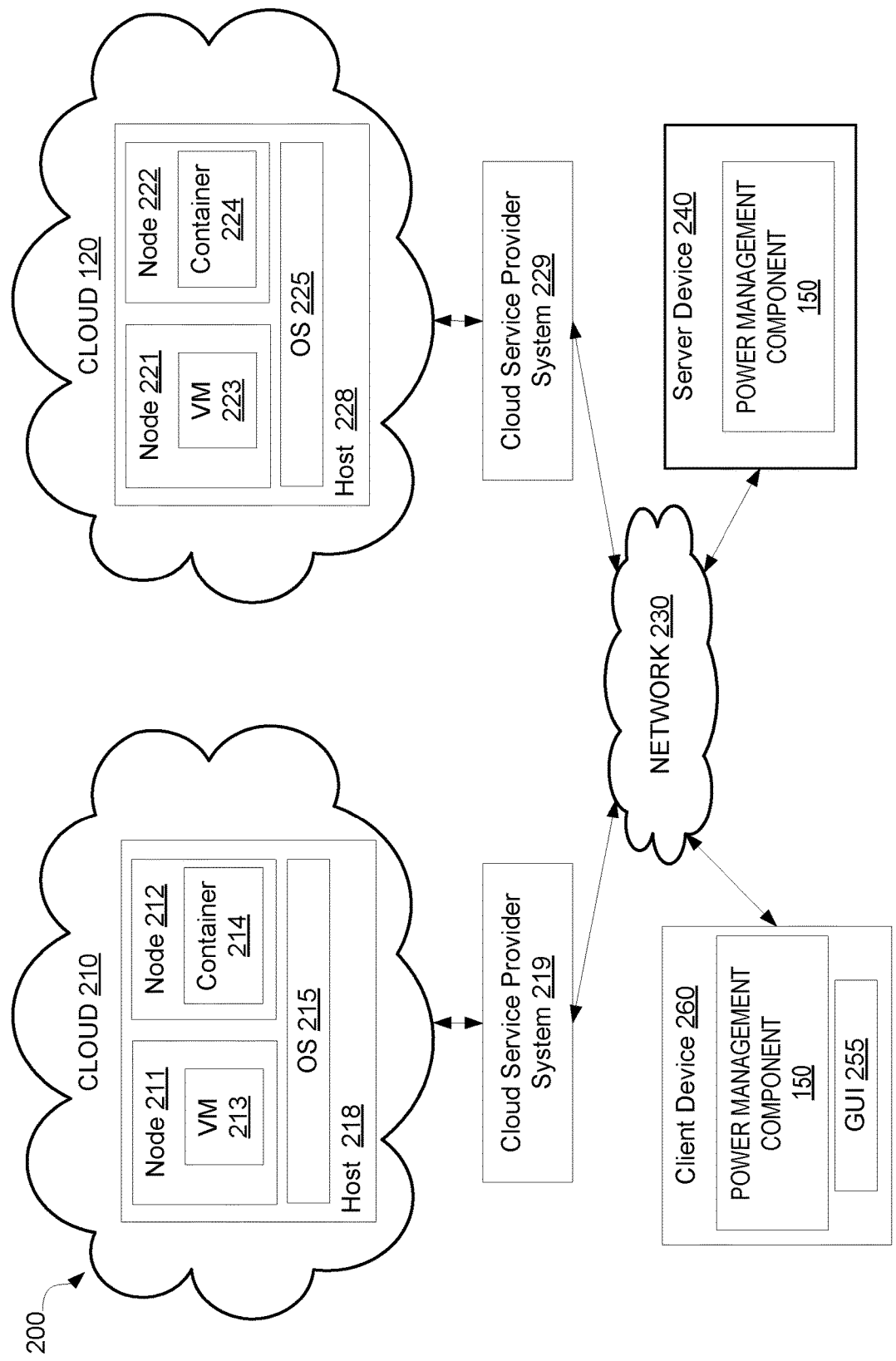
FIG. 2 depicts a high-level component diagram of an example of a computer system architecture, in accordance with one or more aspects of the present disclosure.

FIG. 2 is a block diagram of a network architecture 200 in which implementations of the disclosure may operate. In some implementations, the network architecture 200 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 2, the network architecture 200 includes one or more cloud-computing environment 210, 220 (also referred to herein as a cloud(s)) that includes nodes 211, 212, 221, 222 to execute applications and/or processes associated with the applications. A "node" providing computing functionality may provide the execution environment for an application of the PaaS system. In some implementations, the "node" may include a virtual machine (VMs 213, 223) that is hosted on a physical machine, such as host 218, 228 implemented as part of the clouds 210, 220. For example, nodes 211 and 212 are hosted on physical machine of host 218 in cloud 210 provided by cloud provider 219. Similarly, nodes 221 and 222 are hosted on physical machine of host 228 in cloud 220 provided by cloud provider 229. In some implementations, nodes 211, 212, 221, and 222 may additionally or alternatively include a group of VMs, a container (e.g., container 214, 224), or a group of containers to execute functionality of the PaaS applications. When nodes 211, 212, 221, 222 are implemented as VMs, they may be executed by operating systems (OSs) 215, 225 on each host machine 218, 228. While two cloud providers systems have been depicted in FIG. 2, in some implementations more or fewer cloud service provider systems (and corresponding clouds) may be present.

In some implementations, the host machines 218, 228 can be located in data centers. Users can interact with applications executing on the cloud-based nodes 211, 212, 221, 222 using client computer systems (not pictured), via corresponding client software (not pictured). Client software may include an application such as a web browser. In other implementations, the applications may be hosted directly on hosts 218, 228 without the use of VMs (e.g., a "bare metal" implementation), and in such an implementation, the hosts themselves are referred to as "nodes".

In various implementations, developers, owners, and/or system administrators of the applications may maintain applications executing in clouds 210, 220 by providing software development services, system administration services, or other related types of configuration services for associated nodes in clouds 210, 220. This can be accomplished by accessing clouds 210, 220 using an application programmer interface (API) within the applicable cloud service provider system 219, 229. In some implementations, a developer, owner, or system administrator may access the cloud service provider system 219, 229 from a client device (e.g., client device 260) that includes dedicated software to interact with various cloud components. Additionally, or alternatively, the cloud service provider system 219, 229 may be accessed using a web-based or cloud-based application that executes on a separate computing device (e.g., server device 240) that communicates with client device 260 via network 230.

Client device 260 is connected to host 218 in cloud 210 and host 228 in cloud 220 and the cloud service provider systems 219, 229 via a network 230, which may be a private network (e.g., a local area network (LAN), a wide area network (WAN), intranet, or other similar private networks) or a public network (e.g., the Internet). Each client 260 may be a mobile device, a PDA, a laptop, a desktop computer, a tablet computing device, a server device, or any other computing device. Each host 218, 228 may be a server computer system, a desktop computer, or any other computing device. The cloud service provider systems 219, 229 may include one or more machines such as server computers, desktop computers, etc. Similarly, server device 240 may include one or more machines such as server computers, desktop computers, etc.

In some implementations, the client device 260 may include a power management component 150 as described with respect to FIG. 1. The power management component 150 may be an application that executes on client device 260 and/or on server device 240. In some implementations, power management component 150 can function as a web-based or cloud-based application that is accessible via a web browser or other user interface that executes on client device 260. For example, the client machine 260 may present a graphical user interface (GUI) 255 (e.g., a webpage rendered by a browser) to allow users to input data to be processed by the power management component 150. The process performed by power management component 150 can be invoked, e.g., via a web front-end and/or a Graphical User Interface (GUI) tool. In some implementations, a portion of power management component 150 may execute on client device 260 and another portion of power management component 150 may execute on server device 240. While aspects of the present disclosure describe power management component 150 as implemented in a PaaS environment, it should be noted that in other implementations, power management component 150 can also be implemented in an Infrastructure-as-a-Service (IaaS) environment associated with a containerized computing services platform, such as Red Hat® OpenStack®. The functionality of power management component 150 will be described in further detail below with respect to FIG. 3.

Figure 3:
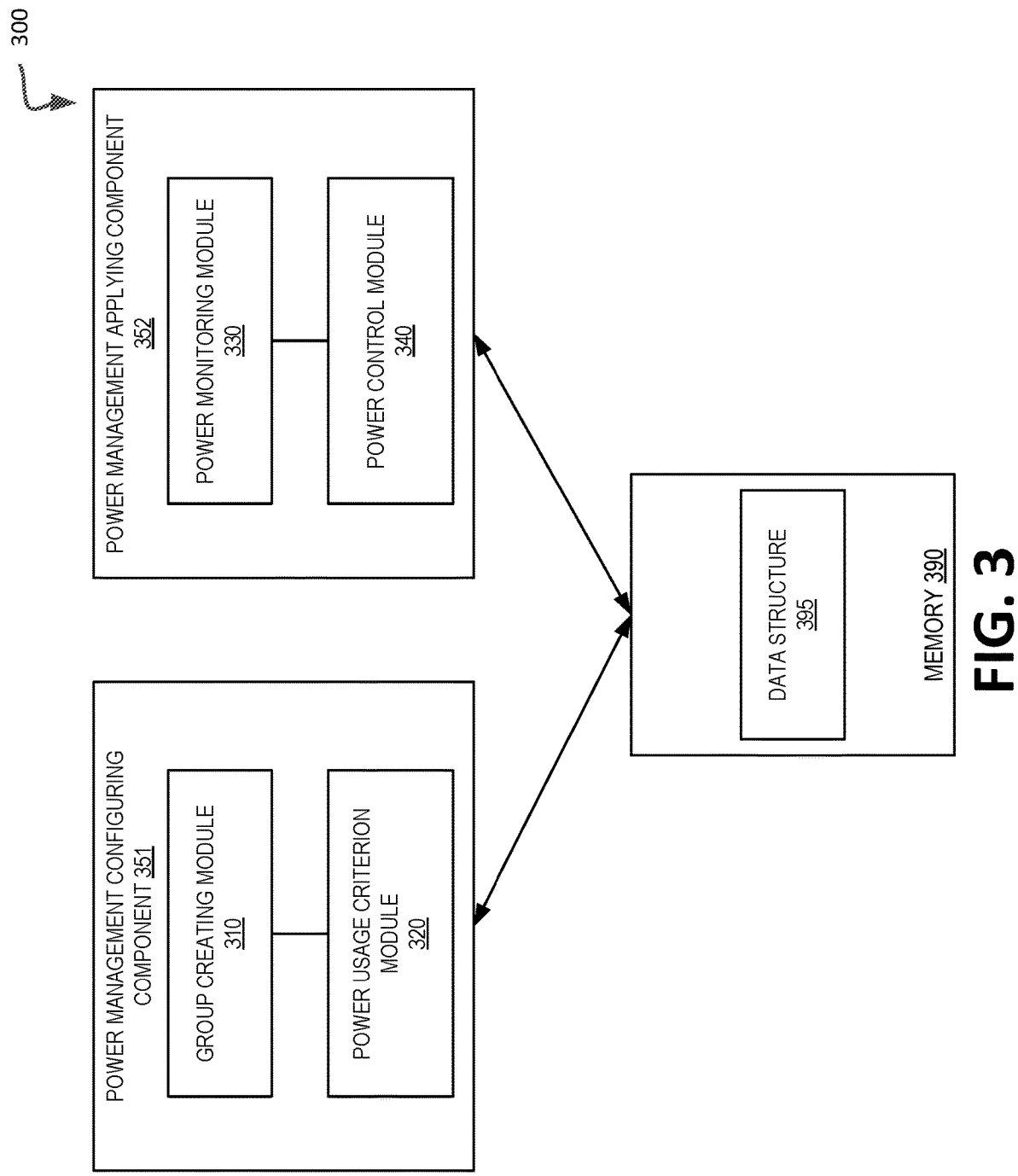
FIG. 3 is a block diagram of a detailed view of a computer system implementing a power management component according to an implementation of the disclosure.

FIG. 3 depicts a block diagram illustrating an example 300 of a computer system in accordance with some implementations of the disclosure. The power management configuring component 351 and the power management applying component 352 of FIG. 3 may be combined in one component that is the same as the power management component 150 of FIGS. 1 and 2. As illustrated, the power management configuring component 351 may include a group creating module 310 and a power usage criterion module 320. The power management applying component 352 may include a power monitoring module 330 and a power control module 340. The power management configuring component 351 and the power management applying component 352 may be coupled to memory 390 or any other suitable memory that stores data that can be used to implement various embodiments of the present disclosure. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The group creating module 310 may create a group of processes that are bound by a criterion of power consumption. The criterion of power consumption may be defined by the power usage criterion module 320. The power monitoring module 330 can monitor power usage by each process in the group of processes. The power control module 340 can control the power usage by each process in the group of processes according to the monitoring result from the power monitoring module 330. The memory 390 can include data structure 396 for the information of processes (e.g., applications) regarding the power consumption.

In some implementations, the group creating module 310 can create a group for the group of processes at boot time. For example, the group creating module 310 can create the group according to a metrics of the process to be included in the group. For example, the group creating module 310 may determine the metrics as a purpose of a service provided by the process, e.g., an education purpose, an entertainment purpose, a navigation purpose, etc. As another example, the group creating module 310 may determine the metrics as a using frequency of the process to be included in the group, e.g., hourly-used, daily-used, or weekly-used. As yet another example, the group creating module 310 may determine the metrics as a using duration of the process to be included in the group, e.g., used for minutes, used for hours, etc. As yet another example, the group creating module 310 may determine the metrics as a priority associated with the process to be included in the group, e.g., important, standard, trivial, etc. The priority can be determined according to a user instruction or a default rank known in the industry. In some implementations, the group can be reestablished during the operation of the computer system.

In some implementations, the group creating module 310 provides a user interface that allows a user to give instructions for configuring a group of processes. For example, the group creating module 310 may receive requests (e.g., from VM, etc.) to place an application in a particular group of processes and may fulfill such requests. In some implementations, the group creating module 310 determines a metrics of an application, and place the application in a group of processes according to the metrics of the application. For example, the group creating module 310 may determine the metrics as a category of an application, e.g., an education application, an entertainment application, a navigation application, etc., or a sub-category of an application, e.g., a gaming application, a streaming application, a social media application, etc. As another example, the group creating module 310 may determine the metrics as a using frequency of an application, e.g., an hourly-used application, a daily-used application, a weekly-used application. As yet another example, the group creating module 310 may determine the metrics as a using duration of an application, e.g., a minute-duration application, an hour-duration application, etc. As yet another example, the group creating module 310 may determine the metrics as a priority associated with an application, e.g., a tier-1-priority application, a tier-2-priority application, etc. The tiers of the priority can be determined according to a user instruction or a default rank known in the industry.

The power usage criterion module 320 may set a power usage criterion (e.g., a quota). In some implementations, the power usage criterion module 320 provides a user interface that allows a user to give instructions for setting the power usage criterion. For example, the power usage criterion module 320 may determine the power usage criterion for the group of processes in the group with the education purpose to be X1 quota, the group with the entertainment purpose to be Y1 quota, the group with the navigation purpose to be Z1 quota, etc. As another example, the power usage criterion module 320 may determine the power usage criterion for the group of processes in the group with hourly-used frequency to be X2 quota, the group with daily-used frequency to be Y2 quota, the group with weekly-used frequency to be Z2 quota, etc. As yet another example, the power usage criterion module 320 may determine the power usage criterion for the group of processes in the group with usage for minutes to be X3 quota, group with usage for minutes to be Y3 quota, etc. As yet another example, the power usage criterion module 320 may determine the power usage criterion for the group of processes in the group with a high priority (important) to be X4 quota, the group with a medium priority (standard) to be Y4 quota, the group with a low priority (trivial) to be Y4 quota, etc.

The power monitoring module 330 can monitor power usage of each process in the group of processes. In some implementations, the power monitoring module 330 can determine the available power supply of the computer system, and calculate the proportional power usage allowance for processes in the group. For example, the available power supply of the computer system can be represented by a remaining battery percentage, and the power monitoring module 330 can determine the available power supply of the computer system to be A % remaining battery, and calculate the power usage allowance for a process by multiplying A % remaining battery with the respective power usage criterion.

The power monitoring module 330 can monitor the power consumption of each process in the group of processes according to the respective power usage allowance. In some implementations, the power consumption of the application is monitored by using the total power consumed by the process, which may include the power used by various resources, including processors, memory, storage, and/or I/O devices. The power monitoring module 330 can determine whether the power consumption of each process in the group of processes exceeds a respective power usage allowance. Responsive to determining that a power consumption of a process exceeds a respective power usage allowance, the power monitoring module 330 can send instructions to the power control module 340 to control the power usage of the process.

The power control module 340 can limit the power consumption of a process by limiting power consumed by at least one resource used by the process. The resources may include one or more processors, one or more memory, one or more storage, and one or more I/O devices.

The power control module 340 can switch a processor power state where a processor dispatches and executes instructions to a power saving state (e.g., lower-power idle states) where no instructions are executed and power consumption is reduced to a desired level. In some embodiments, the processor power states may include one or more processor idle states, such as one or more C-states in accordance with the Advanced Configuration and Power Interface (ACPI) standard. The power control module 340 can use a scheduler to control the access to processors by a process. The power control module 340 can also control the number of processors assigned to perform a process.

The power control module 340 can set limits on parameters for memory/storage use. The power control module 340 can control the number of memory/storage assigned to perform a process. The power control module 340 can divide memory/storage into partitions and control the memory/storage power usage by assigning different partitions and different number of the partitions. The power control module 340 can set limits on parameters for input/output access to and from I/O devices. The power control module 340 can limit the communication traffic through I/O devices. The power control module 340 can control the number of I/O devices assigned to perform a process.

Figure 4:
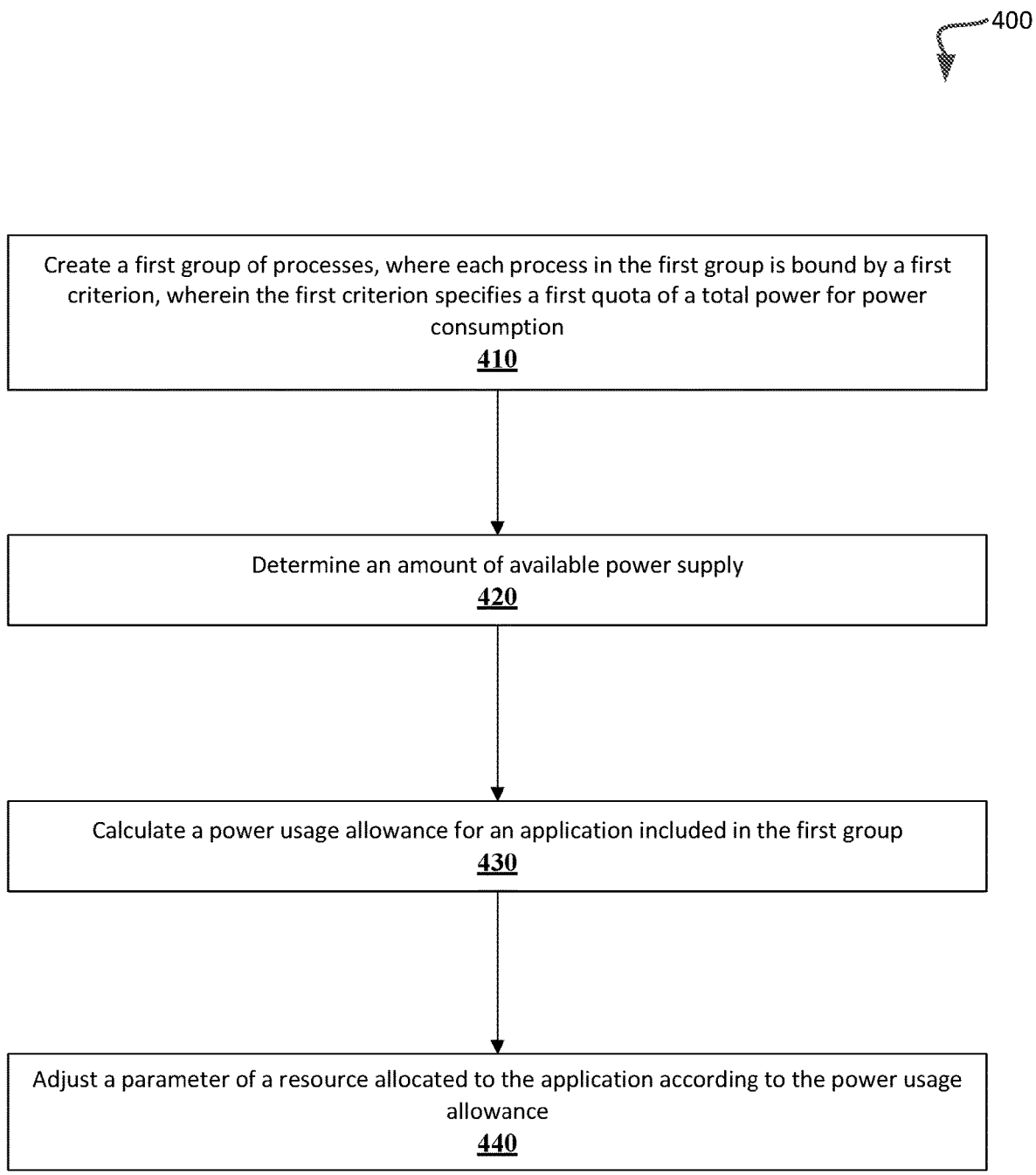
FIGS. 4-5 depict flow diagrams of example methods for implementing optimized power management, in accordance with one or more aspects of the present disclosure.
Figure 5:
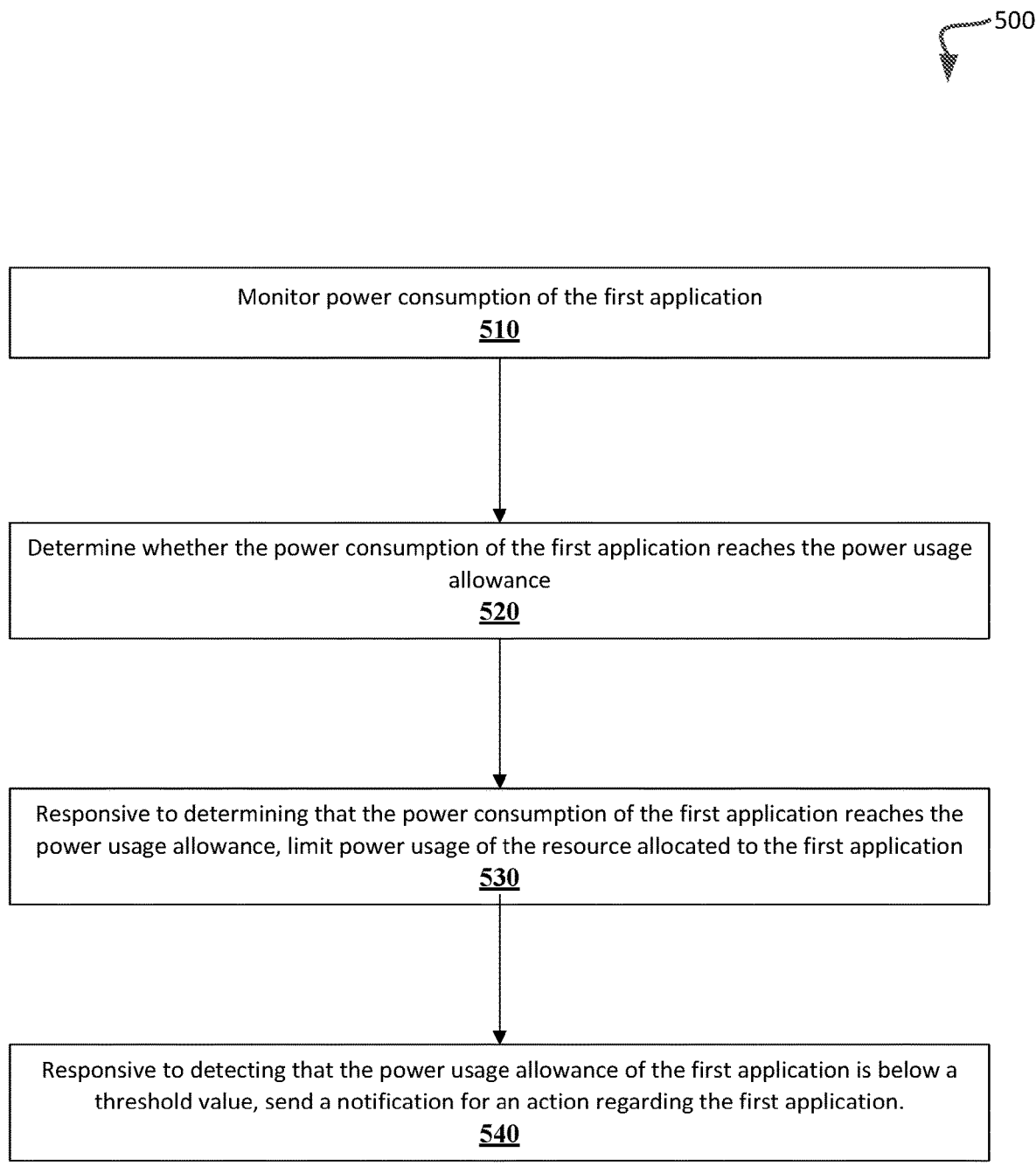

FIGS. 4 and 5 are flow diagrams illustrating methods 400 and 500 for implementing optimized power management in accordance with one or more aspects of the present disclosure. Methods 400 and 500 may be performed by processing devices that may comprise hardware (e.g., circuitry, dedicated logic, programmable logic, microcode, etc.), executable code (such as is run on a general-purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processes implementing methods 400 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 400 and 500 may be performed by power management component 150 as shown in FIGS. 1 and 2.

Referring to FIG. 4, at operation 410, the processing device creates a first group of processes where each process is bound by a first criterion, where the first criterion specifies a first quota for power consumption. In some implementations, the processing device can store information of the created first group in a configuration file. In some implementations, the processing device can provide a user interface that allows a user to give instructions for configuring the first group of processes and the first quota. In some implementations, the first group of processes can include one or more applications, tasks, or threads.

In some implementations, the processing device can associate a process running on a computing system with a first power usage control group of a plurality of power usage control groups, where each power usage control group is associated with a respective power usage quota to be shared by a plurality of processes associated with the power usage control group. In some implementations, associating the process with the first power usage control group is performed according to a metric of the process, where the metric comprises at least one of: a category of the process, a using frequency of the process, a using duration of the process, or a priority associated with the process. In some implementations, the first power usage control group and a second power usage control group of the plurality of power usage control groups are arranged in a hierarchy, where a corresponding power consumption for the second power usage control group is throttled to not exceed the throttled corresponding power consumption for the first power usage control group.

At operation 420, the processing device determines an amount of available power supply. In some implementations, the processing device can determine the amount of available power supply at a predefined frequency, upon detecting a power event, or upon receiving a user request.

At operation 430, the processing device calculates a power usage allowance for a first process included in the first group based on the first criterion and the amount of available power. In some implementations, the processing device can multiply the amount of available power by the first quota to obtain the power usage allowance for the first process. In some implementations, the processing device calculates a first power usage allowance for each process of the first plurality of processes based on the first power usage quota and the amount of available power supply, where throttling the corresponding power consumption is performed based on the first power usage allowance. In some implementations, calculating the first power usage allowance is performed responsive to at least one of: at a predefined frequency, or upon detecting a power event.

At operation 440, the processing device adjust a parameter of a resource allocated to the first process according to the power usage allowance. The resource incudes at least one of: a memory, a central processing unit (CPU), or an input/output (I/O) device. In some implementations, the processing device can assign one or more memory, one or more CPU, one or more I/O devices to the first process according to the power usage allowance.

In some implementations, the processing device can throttle, for each process of a first plurality of processes associated with the first power usage control group, a corresponding power consumption based on a first power usage quota associated with the first power usage control group. In some implementations, the processing device can throttle the corresponding power consumption by adjusting, based on the first power usage quota, a parameter of a computing resource being consumed by a first process of the first plurality of processes. The parameter specifies at least one of: a CPU usage limit, an input/output (I/O) bandwidth limit, a screen brightness limit, or a memory usage limit. In some implementations, the processing device can throttle the corresponding power consumption by modifying a power state of a CPU allocated to a first process of the first plurality of processes. In some implementations, the processing device can throttle the corresponding power consumption by causing a first process of the first plurality of processes to transition to a waiting state.

Referring to FIG. 5, at operation 510, the processing device monitors the power consumption of the first process. In some implementations, the power consumption of the first process is monitored by using the total power consumed by the first process, which may include the power used by a processor, a memory/storage device, and I/O device. In some implementations, the processing device creates automatic reports on CPU, memory, and/or I/O resources used by the first process and the respective power consumption.

At operation 520, the processing device determines whether the power consumption of the first process reaches the power usage allowance for the purpose of throttling the power consumption of the first process. For example, the processing device can determine the power consumption of the first process reaching the power usage allowance as an indication for performing throttling. At operation 530, the processing device, responsive to determining that the power consumption of the first process exceeds the power usage allowance, limits power usage of the resource allocated to the first process.

In some implementations, the processing device can limit the power usage of the resources by setting limits on parameters for input/output access by the first process, setting limits on parameters for memory access by the first process, switching a power state of a CPU used by the first process, reducing a number of the resource allocated to the first process, reducing a portion of the resource allocated to the first process, or suspending or resuming the first process.

At operation 540, the processing device, responsive to detecting that the power usage of the resource allocated to the first process (e.g., power usage allowance for the first process) is below a threshold value, send a notification including a recommendation for an action regarding the first process. In some implementations, the processing device can detect that the power usage allowance for the first process is below a threshold value and notify a user regarding the detection. In some implementations, the processing device can provide a recommendation of an action regarding the first process in response to the detection.

Figure 6:
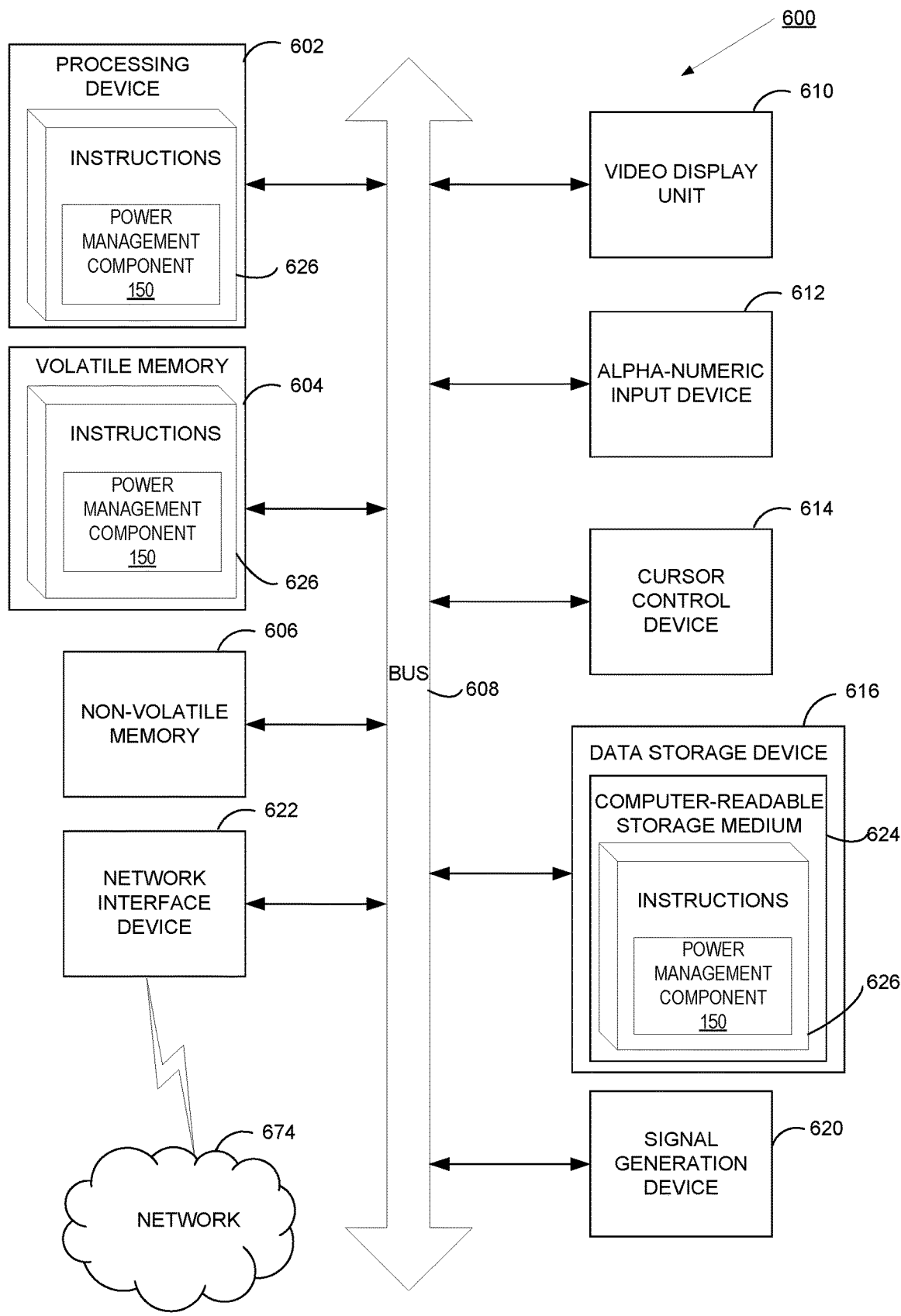
FIG. 6 depicts a block diagram of an illustrative computing device operating in accordance with the examples of the present disclosure.

FIG. 6 depicts an example computer system 600, which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 is configured to execute processing logic (e.g., instructions 626) that includes the power management component 150 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include power management component 150 (e.g., corresponding to the methods of FIGS. 4-5, etc.) embodying any one or more of the methodologies or functions described herein. Power management component 150 may also reside, completely or at least partially, within the main memory 604 and/or within the processing device 602 during execution thereof by the computer system 600, the main memory 604, and the processing device 602 also constituting computer-readable media. Power management component 150 may further be transmitted or received via the network interface device 622.

While the computer-readable storage medium 624 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
   associating, by a processing device, a first plurality of processes running on a computing system with a first power usage control group of a plurality of power usage control groups, wherein each power usage control group is associated with a respective power usage quota to be shared by a plurality of processes associated with the power usage control group;
determining an amount of available power supply in the computing system;
calculating a first power usage allowance for the first plurality of processes of the first power usage control group based on the respective power usage quota for the first plurality of processes of the first power usage control group and the amount of available power supply in the computing system; and
throttling, for each process of the first plurality of processes associated with the first power usage control group, a corresponding power consumption based on the first power usage allowance for the first plurality of processes of the first power usage control group, wherein throttling the power consumption for each process of the first plurality of processes comprises:
adjusting, by the computing system, a parameter that controls scheduling of a first process of the first plurality of processes based on a priority of the first process of the first plurality of processes.

2. The method of claim 1, wherein throttling the corresponding power consumption further comprises:
adjusting, based on the first power usage allowance for the first plurality of processes of the first power usage control group, a parameter of a computing resource being consumed by a second process of the first plurality of processes.

3. The method of claim 2, wherein the parameter of the computing resource being consumed by the second process specifies at least one of: a central processing unit (CPU) usage limit, an input/output (I/O) bandwidth limit, a screen brightness limit, or a memory usage limit.

4. The method of claim 1, wherein throttling the corresponding power consumption further comprises:
modifying a power state of a CPU allocated to a second process of the first plurality of processes.

5. The method of claim 1, wherein throttling the corresponding power consumption further comprises:
causing a second process of the first plurality of processes to transition to a waiting state.

6. The method of claim 1, wherein the first power usage control group and a second power usage control group of the plurality of power usage control groups are arranged in a hierarchy, wherein a corresponding power consumption for the second power usage control group is throttled to not exceed the throttled corresponding power consumption for the first power usage control group.

7. The method of claim 1, wherein associating the first plurality of processes with the first power usage control group is performed according to a metric of a process in the first plurality of processes, wherein the metric comprises at least one of: a category of the process, a using frequency of the process, or a using duration of the process.

8. The method of claim 1, wherein calculating the first power usage allowance is performed responsive to at least one of: at a predefined frequency, or upon detecting a power event.

9. The method of claim 1, wherein calculating the first power usage allowance for the first plurality of processes of the first power usage control group further comprises:
multiplying the respective power usage quota for the first plurality of processes of the first power usage control group by the amount of available power supply in the computing system.

10. A system comprising:
a memory; and
a processing device operatively coupled to the memory, the processing device to perform operations comprising:
associating a first plurality of processes running on a computing system with a first power usage control group of a plurality of power usage control groups, wherein each power usage control group is associated with a respective power usage quota to be shared by a plurality of processes associated with the power usage control group;
determining an amount of available power supply in the computing system;
calculating a first power usage allowance for the first plurality of processes of the first power usage control group based on the respective power usage quota for the first plurality of processes of the first power usage control group and the amount of available power supply in the computing system; and
throttling, for each process of the first plurality of processes associated with the first power usage control group, a corresponding power consumption based on the first power usage allowance for the first plurality of processes of the first power usage control group, wherein throttling the power consumption for each process of the first plurality of processes comprises:
adjusting, by the computing system, a parameter that controls scheduling of a first process of the first plurality of processes based on a priority of the first process of the first plurality of processes.

11. The system of claim 10, wherein throttling the corresponding power consumption further comprises:
adjusting, based on the first power usage allowance for the first plurality of processes of the first power usage control group, a parameter of a computing resource being consumed by a second process of the first plurality of processes.

12. The system of claim 11, wherein the parameter of the computing resource being consumed by the second process specifies at least one of: a central processing unit (CPU) usage limit, an input/output (I/O) bandwidth limit, a screen brightness limit, or a memory usage limit.

13. The system of claim 10, wherein throttling the corresponding power consumption further comprises:
modifying a power state of a CPU allocated to a second process of the first plurality of processes.

14. The system of claim 10, wherein throttling the corresponding power consumption further comprises:
causing a second process of the first plurality of processes to transition to a waiting state.

15. The system of claim 10, wherein the first power usage control group and a second power usage control group of the plurality of power usage control groups are arranged in a hierarchy, wherein a corresponding power consumption for the second power usage control group is throttled to not exceed the throttled corresponding power consumption for the first power usage control group.

16. The system of claim 10, wherein associating the first plurality of processes with the first power usage control group is performed according to a metric of a process in the first plurality of processes, wherein the metric comprises at least one of: a category of the process, a using frequency of the process, or a using duration of the process.

17. The system of claim 10, wherein calculating the first power usage allowance is performed responsive to at least one of: at a predefined frequency, or upon detecting a power event.

18. A non-transitory machine-readable storage medium including instructions that, when accessed by a processing device, cause the processing device to perform operations comprising:

associating a first plurality of processes running on a computing system with a first power usage control group of a plurality of power usage control groups, wherein each power usage control group is associated with a respective power usage quota to be shared by a plurality of processes associated with the power usage control group;

determining an amount of available power supply in the computing system;

calculating a first power usage allowance for the first plurality of processes of the first power usage control group based on the respective power usage quota for the first plurality of processes of the first power usage control group and the amount of available power supply in the computing system; and throttling, for each process of the first plurality of processes associated with the first power usage control group, a corresponding power consumption based on the first power usage allowance for the first plurality of processes of the first power usage control group, wherein throttling the power consumption for each process of the first plurality of processes comprises:

adjusting, by the computing system, a parameter that controls scheduling of a first process of the first plurality of processes based on a priority of the first process of the first plurality of processes.

19. The non-transitory machine-readable storage medium of claim 18, wherein throttling the corresponding power consumption further comprises:

adjusting, based on the first power usage allowance for the first plurality of processes of the first power usage control group, a parameter of a computing resource being consumed by a second process of the first plurality of processes.

* * * * *